United States Patent
Yeo

[11] Patent Number: 6,043,188
[45] Date of Patent: Mar. 28, 2000

[54] PROCESS FOR MANUFACTURING PALLADIUM TERNARY CATALYST

[75] Inventor: Gwon Koo Yeo, Kyungki-do, Rep. of Korea

[73] Assignee: Hyundai Motor Company, Seoul, Rep. of Korea

[21] Appl. No.: 08/970,784

[22] Filed: Nov. 14, 1997

[51] Int. Cl.[7] .............................. B01J 23/44; B01J 23/10
[52] U.S. Cl. .................. 502/333; 502/303; 502/304; 502/325; 502/328; 502/339
[58] Field of Search ................... 502/303, 304, 502/325, 328, 333, 339

[56] References Cited

U.S. PATENT DOCUMENTS 4,134,860  1/1970  Hindin et al. ........................ 252/466
5,413,984  5/1995  Marecot et al. ...................... 502/333

*Primary Examiner*—John F. Niebling
*Assistant Examiner*—Alexander G. Ghyka

[57] ABSTRACT

A process for manufacturing a palladium ternary catalyst and more particularly, to an improved process for manufacturing a palladium ternary catalyst fabricated by reducing a palladium solution impregnated with or containing alumina, adding a mixing solution consisting of barium oxide, etc., adjusting its pH for further reaction, milling the mixture, coating catalyst material to ceramic monolith substrate, drying and calcining the catalyst material. As a result, a ternary catalyst of this invention containing single layer palladium only can effectively purify the harmful substances derived from automobile exhaust gas, together with cost-saving effects, compared to the conventional ternary catalyst consisting of platinum, rhodium and palladium.

7 Claims, 1 Drawing Sheet

PROCESS FOR MANUFACTURING PALLADIUM TERNARY CATALYST

BACKGROUND OF THE INVENTION

1. Field of the Invention

The present invention relates to a process for manufacturing a palladium ternary catalyst and more particularly, to an improved process for manufacturing a palladium ternary catalyst fabricated by reducing a palladium solution containing alumina, adding a mixing solution consisting of barium oxide, etc., adjusting its pH for further reaction, milling the mixture, coating the catalyst materials to a ceramic monolith substrate, and drying and calcinating the composite. As a result, the ternary catalyst of the present invention containing palladium can effectively purify automobile exhaust gas, containing harmful substances together with achieving cost-saving effects, as compared to the conventional ternary catalyst consisting of platinum, rhodium and palladium.

2. Description of the Prior Art

In general, a ternary catalyst refers to a catalyst which serves to remove harmful substances from automobile exhaust gas, such as hydrocarbon compounds, carbon monoxide and nitrogen oxide(NOx), by simultaneous reacting with them. In the past years, the conventional ternary catalyst which have been employed include Pt/Rh, Pd/Rh or Pt/Pd/Rh.

However, the conventional catalyst always contains rhodium(RH) as a necessary catalyst ingredient for reducing nitrogen oxide, from the exhaust gas. However, such an element is expensive and contains a poor heat-resisting property.

With a view toward overcoming the defects in the conventional ternary catalyst, the present inventors have carried out extensive studies have completed the present invention by using palladium only instead of high-priced rhodium in such a manner that palladium is mixed with alumina and through reaction with a base metal oxide, the mixture is milled, coated, dried and calcined.

SUMMARY OF THE INVENTION

Therefore, an object of the present invention is to provide an economical process of manufacturing a single layer of a palladium ternary catalyst consisting of palladium only instead of high-priced rhodium, having excellent purification effects on the harmful substances contained in automobile exhaust gas.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
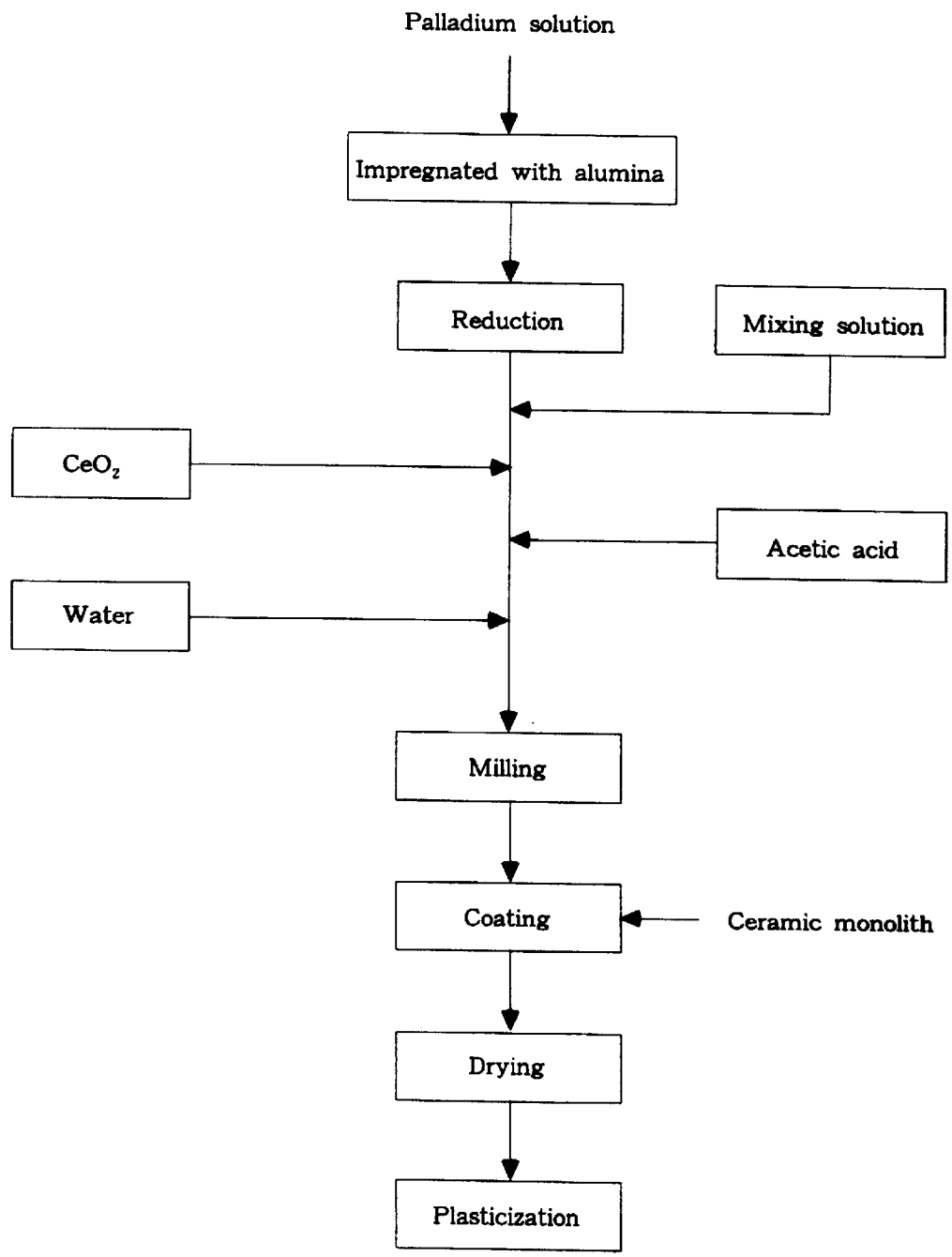
FIG. 1 is a schematic flowsheet showing a process of manufacturing the palladium ternary catalyst according to the present invention.

The present invention relates to a process of manufacturing a palladium ternary catalyst, which comprises:

Reducing a palladium solution impregnated with or containing alumina;

Adding cerium oxide($CeO_2$) and a mixing solution to the mixture;

Adding acetic acid to the reaction solution and adjusting the pH to more than 4.5;

milling the mixture to obtain a particle size of 7~9 $\mu$m in more than 90% of the mixture; and Drying and calcining the particles coated with a ceramic monolith carrier.

The present invention can be explained in more detail as set forth hereunder.

The present invention relates to a ternary catalyst consisting of palladium only and to a manufacturing process as illustrated in the accompanying schematic drawing.

First, a palladium solution is impregnated with or mixed with alumina reduced.

The method of reducing the palladium solution is to add 1.66 ml of hydrazine hydrate in a dropwise fashion per 1 g palladium.

Then, cerium oxide($CeO_2$) consisting of $CeO_2$ bulk and soluble $CeO_2$ is added to the reacting solution. Cerium oxide is effective in improving the heat-resistant property by inhibiting the compound formation between palladium and alumina. It is preferred that the $CeO_2$ content is in the range of 20~40 g in proportion to the volume of a total carrier.

Further, a mixing solution is added to the reacting solution which consists of barium oxide, lanthanum oxide($La_2O_3$), acetic acid and water. It is preferred that in order to improve the heat-resistant property of alumina, the content of barium oxide is in the range of 5~6 g, depending on the apparent volume of the total carrier.

Also, it is preferred that in order to improve the heat-resisting property of alumina, including better physical property of $CeO_2$, the content of lanthanum oxide is in the range of 1~2 g in proportion to the apparent volume of the total carrier. Further, since acetic acid is additionally added to the mixing solution in a separate manner from above in order to properly adjust the pH, the content of acetic acid should be in the range of 23.5~33.5 g in proportion to the apparent volume of a total carrier. According to the reaction of the present invention, it is preferred that in order to adjust the viscosity involved in the manufacture of a coating slurry, the pH is less than 4.5.

The base metal oxide such as barium oxide or lanthanum oxide functions to improve the heat-resisting property by inhibiting the binding of palladium and alumina, as shown in cerium oxide as above.

By adding a mixing solution to the reaction material as above, the slurry reaction and particle size can be adjusted by a ball mill and during the milling process, the mixture is milled so as to contain the particle sizes of 7~9 $\mu$m in more than 90% of the total particles. If the particle sizes exceed the above range during the milling process, this will affect the initial activity or durability of the ternary catalyst of the present invention.

After the milling process, the micronized catalyst material is coated.

The coating process of the present invention is performed in such a manner that a ceramic monolith carrier is dipped into the catalyst material. The coating process of the present invention comprises a single coating using the segregation effect. Double coating is usually carried out in the prior art for placing certain substances on a desired site, wherein the coating process of the present invention places the components at the desired site by utilizing the existing state of compounds which are lumped together, thereby maximizing the efficiency of a single coating and improving the capacity of a catalyst. More specifically, the coating process of the present invention is performed in such a manner that by selecting the input method of each component and the appropriate starting materials, the desired site may be coated with the desired components merely by dipping.

The catalyst material, coated by the procedure, above, is dried and calcined, i.e., the catalyst material is dried in a drying chamber at 150° C. for 2 hours and then, calcined in an electric chamber at 450–550° C. for 4 hours. If the drying conditions and calcining time exceed the above range, cracks of the coating layers and harmful compounds may occur.

The palladium ternary catalyst, manufactured according to the above process, is a ternary catalyst which serves to eliminate some harmful substances from automobile exhaust gas such as hydrocarbon compounds, carbon monoxide and nitrogen oxide(NOx). In comparison with the conventional ternary catalyst, the ternary catalyst of the present invention exhibits the same or better purification efficiency on hydrocarbon substances and carbon monoxide, while its purification efficiency with respect to nitrogen oxide is enhanced more than 70%. In addition, the present invention proves to be more economical than the conventional ternary catalyst, since it does not contain rhodium.

The palladium ternary catalyst, so manufactured according to the process of the present invention, is a highly effective material which may be widely used for the purification of automobile exhaust gas, while also functioning as a diesel catalyst and an industrial catalyst.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for manufacturing a palladium ternary catalyst which comprises:

reducing a palladium solution containing alumina;

adding cerium oxide ($CeO_2$) and a mixing solution to form a mixture;

adding acetic acid to the mixture and adjusting the pH thereof to less than 4.5;

milling the mixture to obtain a particle size of 7–9 $\mu$m in more than 90% of the mixture; and drying and calcining the particles.

2. The process of claim 1, wherein the reduction is performed by adding 1.5–20 ml of hydrazine hydrate, dropwise, per 1 g of palladium.

3. The process of claim 1, wherein 20–40 g of the cerium oxide is added in proportion to the apparent volume of the total carrier.

4. The process of claim 1, wherein said mixing solution consisting of 5–6 g of barium oxide, 1–2 g of lanthanum oxide ($La_2O_3$) and 23.5–33.5 g of acetic acid is, prior to use, dissolved in water in proportion to the apparent volume of a total carrier.

5. The process of claim 1, wherein the drying is performed at 100–200° C. for 2–5 hours.

6. The process of claim 1, wherein said calcining is performed at 450–550° C. for 4 hours.

7. The process of claim 1, wherein the dried and calcined particles are coated with a ceramic monolith carrier.

* * * * *